United States Patent
Wang et al.

(10) Patent No.: US 12,462,863 B2
(45) Date of Patent: Nov. 4, 2025

(54) REFRESH CONTROL CIRCUIT

(71) Applicant: Winbond Electronics Corp., Taichung (TW)

(72) Inventors: Hsi-Yuan Wang, Hsinchu (TW); Ying-Te Tu, New Taipei (TW)

(73) Assignee: Winbond Electronics Corp., Taichung (TW)

( * ) Notice: Subject to any disclaimer, the term of this patent is extended or adjusted under 35 U.S.C. 154(b) by 166 days.

(21) Appl. No.: 18/499,234

(22) Filed: Nov. 1, 2023

(65) Prior Publication Data
US 2025/0069640 A1    Feb. 27, 2025

(30) Foreign Application Priority Data
Aug. 21, 2023    (TW) ................... 112131387

(51) Int. Cl.
*G11C 11/40*     (2006.01)
*G11C 11/406*    (2006.01)
*G11C 29/20*     (2006.01)

(52) U.S. Cl.
CPC .. *G11C 11/40618* (2013.01); *G11C 11/40615* (2013.01); *G11C 29/20* (2013.01)

(58) Field of Classification Search
CPC ........ G11C 11/40618; G11C 11/40615; G11C 29/20; G11C 11/406; G11C 11/40611; G11C 29/50016; G11C 11/4063
See application file for complete search history.

(56) References Cited

U.S. PATENT DOCUMENTS

| | | | |
|---|---|---|---|
| 9,704,558 B2 | 7/2017 | Doo et al. | |
| 10,418,086 B2 | 9/2019 | Lai | |
| 2019/0189194 A1 | 6/2019 | Kim et al. | |
| 2019/0311763 A1* | 10/2019 | Jin | G11C 11/40626 |
| 2019/0378564 A1 | 12/2019 | Chang et al. | |

FOREIGN PATENT DOCUMENTS

CN    110364201    10/2019

OTHER PUBLICATIONS

"Office Action of Taiwan Counterpart Application", issued on Jul. 16, 2024, p. 1-p. 6.
"Office Action of Taiwan Counterpart Application No. 113131827", issued on Oct. 23, 2024, p. 1-p. 6.

* cited by examiner

*Primary Examiner* — Xiaochun L Chen
(74) *Attorney, Agent, or Firm* — JCIPRNET

(57) ABSTRACT

A refresh control circuit includes a clock signal generator, a plurality of pulse number adjusters and a plurality of address counters. The clock signal generator generates a clock signal. The pulse number adjusters receive the clock signal, and during a time period, respectively generate a plurality of adjusted clock signals by adjusting pulse number of the clock signal according to a plurality of data retention information. The address counters respectively generate a plurality of refresh address information according to the adjusted clock signals. The refresh address information respectively correspond to a plurality of memory banks of a memory device. The memory banks respectively perform refresh operations according to the refresh address information.

13 Claims, 6 Drawing Sheets

| PL | A4 | A3 | A2 | A1 | A0 |
|----|----|----|----|----|----|
| 0  | 0  | 0  | 0  | 0  | 0  |
| 1  | 0  | 0  | 0  | 0  | 1  |
| 2  | 0  | 0  | 0  | 1  | 0  |
| 3  | 0  | 0  | 0  | 1  | 1  |
| 4  | 0  | 0  | 1  | 0  | 0  |
| 5  | 0  | 0  | 1  | 0  | 1  |
| 6  | 0  | 0  | 1  | 1  | 0  |
| 7  | 0  | 0  | 1  | 1  | 1  |
| 8  | 0  | 1  | 0  | 0  | 0  |
| 9  | 0  | 1  | 0  | 0  | 1  |
| 10 | 0  | 1  | 0  | 1  | 0  |
| 11 | 0  | 1  | 0  | 1  | 1  |
| 12 | 0  | 1  | 1  | 0  | 0  |
| 13 | 0  | 1  | 1  | 0  | 1  |
| 14 | 0  | 1  | 1  | 1  | 0  |
| 15 | 0  | 1  | 1  | 1  | 1  |

ADR2       ADR1

FIG. 6

US 12,462,863 B2

REFRESH CONTROL CIRCUIT

CROSS-REFERENCE TO RELATED APPLICATION

This application claims the priority benefit of Taiwan application serial no. 112131387 filed on Aug. 21, 2023. The entirety of the above-mentioned patent application is hereby incorporated by reference herein and made a part of this specification.

BACKGROUND

Technical Field

The disclosure relates to a refresh control circuit, and in particular relates to a refresh control circuit that may improve refresh operation efficiency.

Description of Related Art

In a dynamic random access memory (DRAM), due to the current leakage occurring over time in the storage capacitors within the memory cells, it is necessary to periodically perform refresh operations on the memory cells. The refresh operation of the DRAM may be divided into a burst refresh operation and a distributed refresh operation.

In DRAM, since not all memory cells have the same data retention, if a uniform refresh frequency is adopted to refresh all memory cells, many unnecessary refresh operations are bound to occur. As a result, the memory access bandwidth is reduced and unnecessary power consumption is increased. Therefore, how to optimize the memory refresh operation is an important issue for engineers in this field.

SUMMARY

A refresh control circuit of the disclosure includes a clock signal generator, multiple pulse number adjusters, and multiple address counters. The clock signal generator generates a clock signal. The pulse number adjusters are coupled to the clock signal generator. The pulse number adjusters receive the clock signal, and during a time period, respectively generate multiple adjusted clock signals by adjusting pulse number of the clock signal according to multiple data retention information. The address counters are respectively coupled to the pulse number adjusters and generate multiple refresh address information according to the adjusted clock signals. The refresh address information correspond to multiple memory banks of the memory device, and is configured so that the memory banks respectively perform refresh operations according to the refresh address information.

Another refresh control circuit of the disclosure includes a clock signal generator, an address counter, and multiple multiplexers. The clock signal generator generates a clock signal. The counter performs a counting operation based on the clock signal to generate counting information with N bits, in which N is an integer greater than 2. The multiplexers respectively correspond to multiple memory banks of the memory device. The multiplexers are coupled to the address counter, and respectively select M bits among the N bits of the counting information according to the multiple data retention information, to respectively generate multiple refresh address information. The refresh address information are respectively provided to the memory banks, so that the memory banks respectively perform refresh operations according to the refresh address information.

Based on the above, in the refresh control circuit of the disclosure, by recording the data retention information of multiple memory banks of the memory device, and the pulse number of the clock signal corresponding to counting refresh address information is adjusted according to the data retention information. In this way, the refresh operation frequency of each memory bank may be associated with its data retention information, and the performance of the refresh operation of the memory device may be effectively improved.

BRIEF DESCRIPTION OF THE DRAWINGS

FIG. 6 is a schematic diagram of a generating method of refresh address information of the refresh control circuit of the embodiment of FIG. 5 of the disclosure.

DETAILED DESCRIPTION OF DISCLOSED EMBODIMENTS

Figure 1:
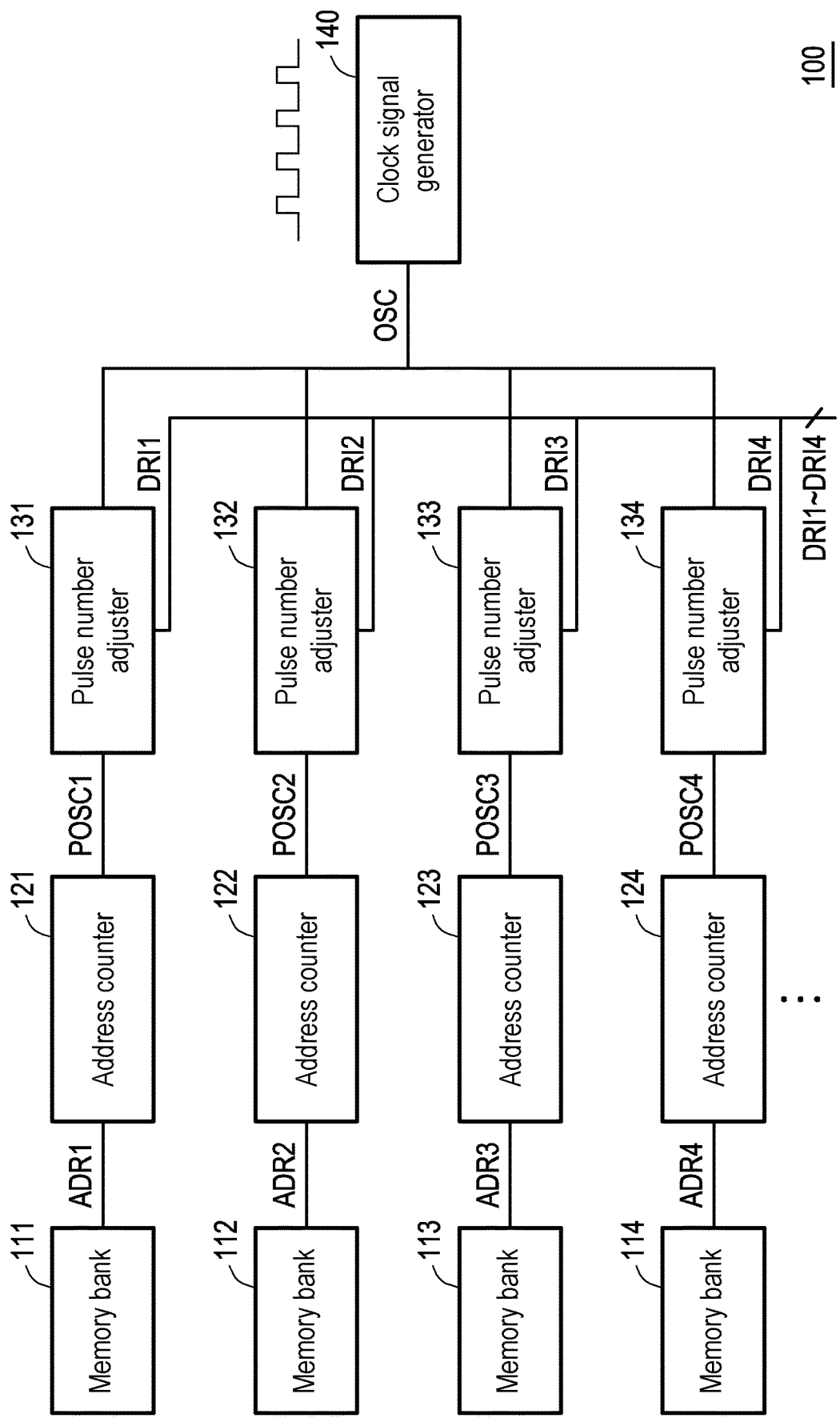
FIG. 1 is a schematic diagram of a refresh control circuit of an embodiment of the disclosure.

Referring to FIG. 1, FIG. 1 is a schematic diagram of a refresh control circuit of an embodiment of the disclosure. The refresh control circuit 100 may be implemented in a memory device, in which the memory device may be a dynamic random access memory device. The refresh control circuit 100 includes a clock signal generator 140, multiple pulse number adjusters 131 to 134, and multiple address counters 121 to 124. The address counters 121 to 124 respectively correspond to multiple memory banks 111 to 114 of the memory device. The clock signal generator 140 is configured to generate a clock signal OSC. The clock signal OSC may be configured as a clock basis for the refresh control circuit 100 to perform the refresh operation. The pulse number adjusters 131 to 134 are coupled to the clock signal generator 140 and receive the clock signal OSC provided by the clock signal generator 140. In addition, the pulse number adjusters 131 to 134 respectively receive data retention information DRI1 to DRI4. The data retention information DRI1 to DRI4 respectively indicate the data retention of the memory banks 111 to 114. During a time period, the pulse number adjusters 131 to 134 respectively generate multiple adjusted clock signals POSC1 to POSC4 by respectively adjusting pulse number of the clock signal OSC according to the received data retention information DRI1 to DRI4.

Please note here that the pulse number adjusters 131 to 134 may respectively generate the adjusted clock signals POSC1 to POSC4 by respectively retaining or reducing the pulse number of the clock signal OSC according to the data retention information DRI1 to DRI4.

Taking the pulse number adjuster 131 as an example, when the corresponding memory bank 111 is detected to have low data retention and is required to perform a relatively high frequency refresh operation, the pulse number adjuster 131 may retain all the pulse numbers of the clock signal OSC in a time period to generate the corresponding adjusted clock signal POSC1. Taking the pulse number adjuster 132 as an example, if the detected data retention of the corresponding memory bank 112 is higher than the data retention of the memory bank 111, it means that the memory bank 112 is required to refresh at a lower frequency than the memory bank 111. Therefore, the pulse number adjuster 132 may reduce the pulse number in the above time period to reduce the execution frequency of the refresh operation of the memory bank 112.

It is worth mentioning that in this embodiment, the data retention information DRI1 to DRI4 may be obtained by testing the memory banks 111 to 114 respectively through the testing device. In this embodiment, each memory bank 111 to 114 may have multiple word lines. The testing device may test the data retention of the memory cells on multiple word lines on each memory bank 111 to 114, and generate each data retention information DRI1 to DRI4 corresponding to each memory bank 111 to 114 according to the word line with the worst data retention on each memory bank 111 to 114.

In this embodiment, the above-mentioned testing device may be a testing machine outside the memory device.

On the other hand, the address counters 121 to 124 are respectively coupled to the pulse number adjusters 131 to 134, and the corresponding memory banks 111 to 114. The address counters 121 to 124 respectively receive the adjusted clock signals POSC1 to POSC4 generated by the pulse number adjusters 131 to 134, and respectively perform address counting operations according to the pulses on the adjusted clock signals POSC1 to POSC4. The address counters 121 to 124 respectively generate refresh address information ADR1 to ADR4. The memory banks 111 to 114 may respectively perform data refresh operations on the memory cells of each bit line according to the refresh address information ADR1 to ADR4.

In this embodiment, the address counters 121 to 124 may be implemented using any counting circuit well known to those skilled in the art, such as a ripple counter formed of multiple T-type flip-flops connected in series or a synchronous counter constructed of multiple D-type flip-flops, without specific limitations. In addition, the clock signal generator 140 may also be implemented using any clock generation circuit well known to those skilled in the art, without specific limitations.

It may be seen from the above description that the refresh control circuit 100 of the embodiment of the disclosure may control the counting frequency of the refresh address information ADR1 to ADR4 by controlling the pulse number of the clock signal OSC. In this way, corresponding to the memory banks 111 to 114 with different data retention, the refresh control circuit 100 may respectively control the refresh operation frequency of the memory banks 111 to 114 by controlling the counting frequency of the refresh address information ADR1 to ADR4. In this way, the refresh control circuit 100 may adjust the refresh operation executed on each memory bank 111 to 114 according to the data retention of each memory bank 111 to 114, thereby improving the performance of the refresh operation.

Figure 2:
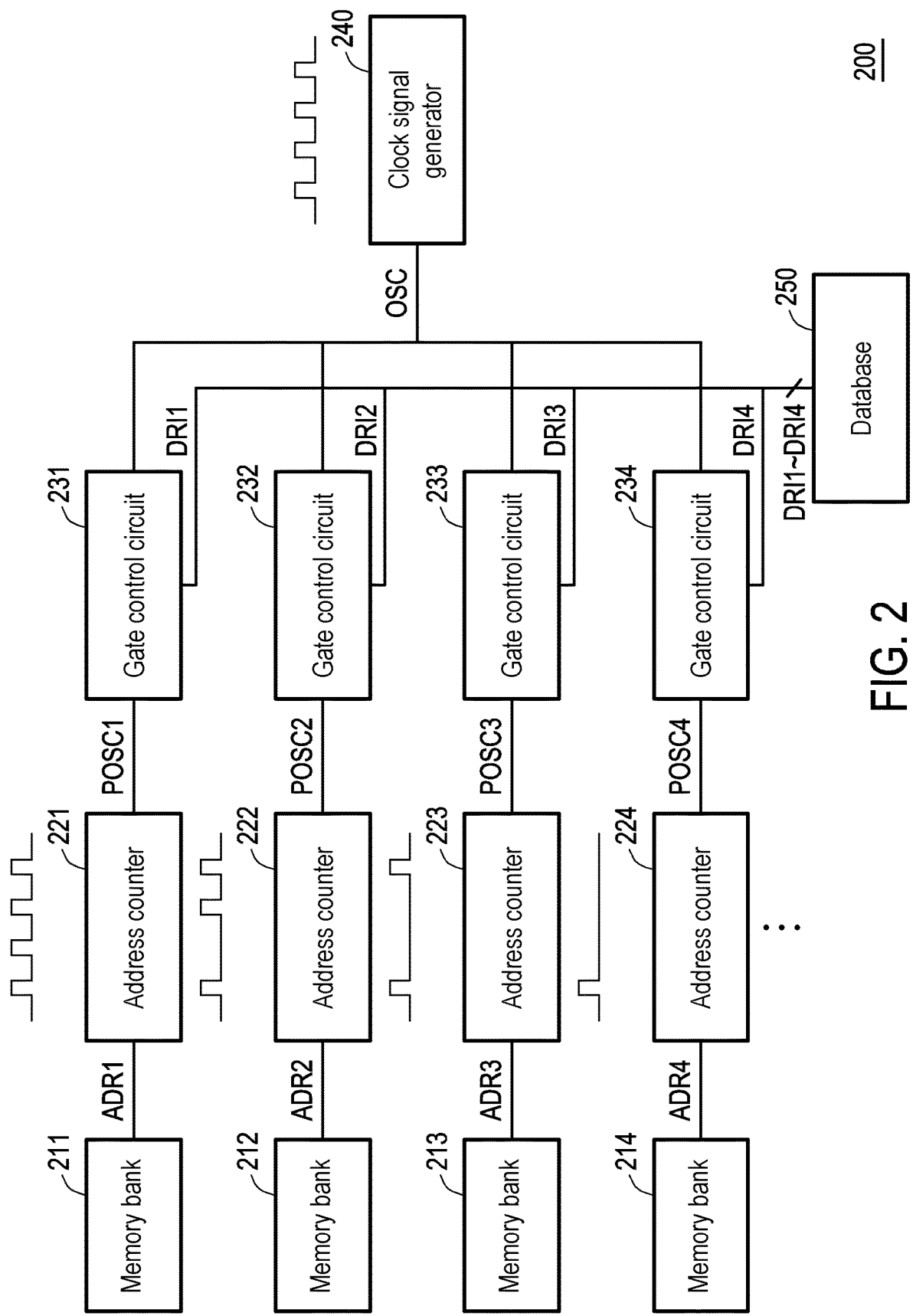
FIG. 2 is a schematic diagram of a refresh control circuit of another embodiment of the disclosure.

Referring to FIG. 2, FIG. 2 is a schematic diagram of a refresh control circuit of another embodiment of the disclosure. The refresh control circuit 200 includes a clock signal generator 240, multiple gate control circuits 231 to 234, multiple address counters 221 to 224, and a database 250. Corresponding to the embodiment of FIG. 1, in this embodiment, the pulse number adjusters 131 to 134 are respectively implemented through the gate control circuits 231 to 234. In detail, the address counters 221 to 224 respectively correspond to multiple memory banks 211 to 214 of the memory device. The clock signal generator 240 is configured to generate the clock signal OSC as a clock basis for the refresh control circuit 200 to execute the refresh operation. The gate control circuits 231 to 234 are coupled to the clock signal generator 240 and receive the clock signal OSC provided by the clock signal generator 240.

In this embodiment, the gate control circuits 231 to 234 receive the data retention information DRI1 to DRI4, and, during a time period, the gate control circuits 231 to 234 respectively determine whether to mask the pulse on the clock signal OSC and the number of pulses to be masked according to the received data retention information DRI1 to DRI4, and thereby respectively generating multiple adjusted clock signals POSC1 to POSC4.

In this embodiment, during a time interval, the clock signal OSC has four pulses, and the ranking of data retention of the memory banks 211 to 214, represented by the data retention information DRI1 to DRI4, in ascending order is for example: DRI1, DRI2, DRI3, and DRI4. The gate control circuit 231 may determine not to mask the pulse on the clock signal OSC according to the data retention information DRI1, and cause the generated adjusted clock signal POSC1 to be the same as the clock signal OSC. The gate control circuit 232 may determine to mask one pulse on the clock signal OSC according to the data retention information DRI2, and the generated adjusted clock signal POSC2 has three pulses in a time interval. The gate control circuit 233 determines to mask two pulses on the clock signal OSC according to the data retention information DRI3, and the generated adjusted clock signal POSC3 has two pulses in a time interval. The gate control circuit 234 may determine to mask three pulses on the clock signal OSC according to the data retention information DRI4, and the generated adjusted clock signal POSC4 has one pulse in a time interval. In this embodiment, the data retention represented by the data retention information DRI1 to DRI4 are positively correlated with the pulse numbers of the clock signal OSC to be masked by the corresponding gate control circuits 231 to 234.

On the other hand, the database 250 is coupled to the gate control circuits 231 to 234. The database 250 is configured to store the data retention information DRI1 to DRI4, and respectively provide the data retention information DRI1 to DRI4 to the gate control circuits 231 to 234. In this embodiment, the testing device may perform testing operations related to data retention on the memory banks 211 to 214 of the memory device, and store the test results (data retention information DRI1 to DRI4) in the database 250. The database 250 may be a non-volatile memory device such as a read-only memory, a flash memory, or an electronic fuse circuit.

Incidentally, in this embodiment, each gate control circuit 231 to 234 may be implemented using digital circuits. For example, the gate control circuits 231 to 234 may respectively receive the data retention information DRI1 to DRI4 as digital codes, and respectively determine the pulse number of the clock signal OSC to be masked according to the data retention information DRI1 to DRI4. Each gate control circuit 231 to 234 may determine zero or more pulses in the mask clock signal OSC. Furthermore, each adjusted clock signal POSC1 to POSC4 may have at least one pulse in a time interval.

The above time interval may be set by the designer according to actual requirements, without specific limitations.

Figure 3:
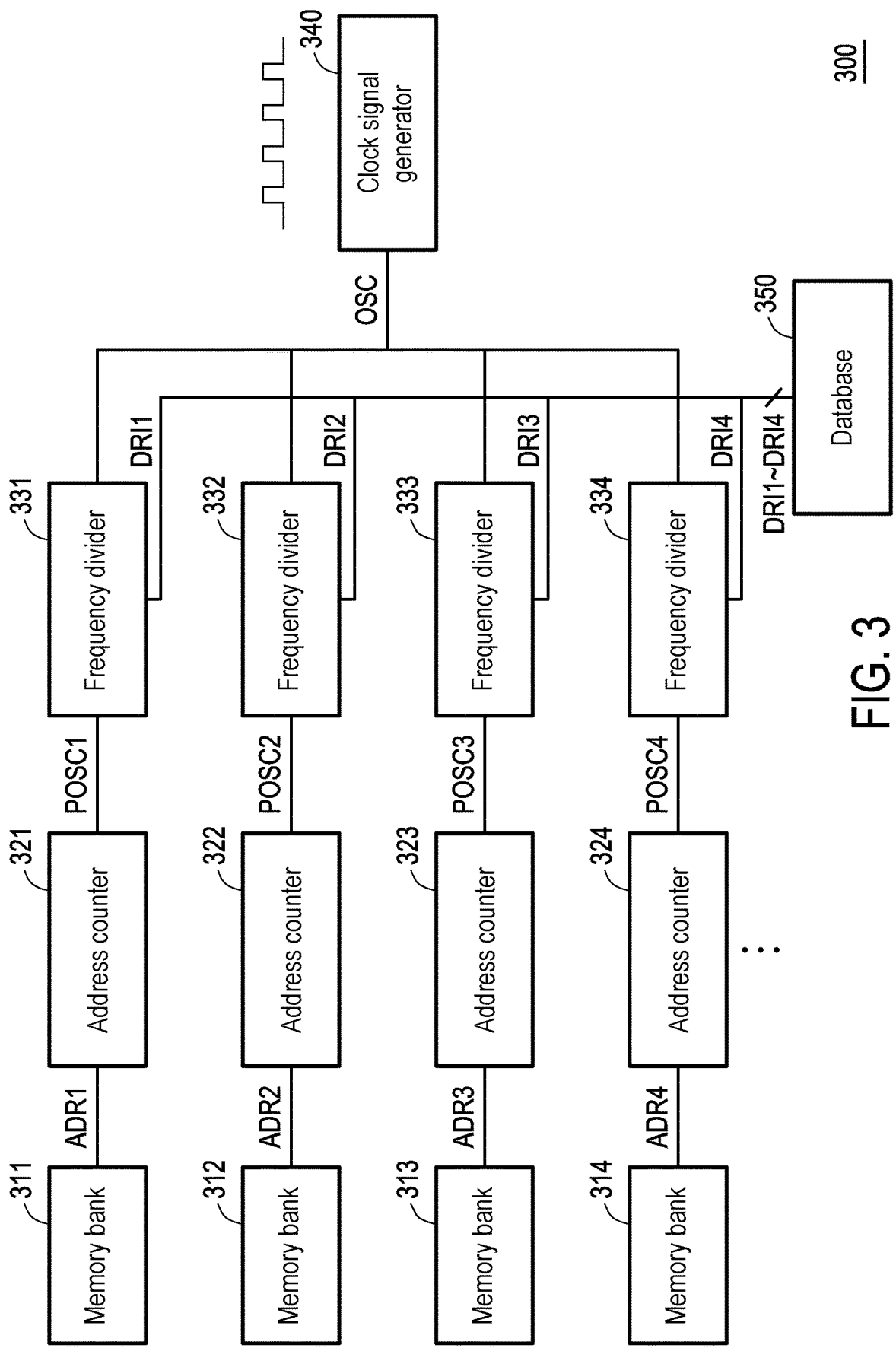
FIG. 3 is a schematic diagram of a refresh control circuit of another embodiment of the disclosure.

Referring to FIG. 3, FIG. 3 is a schematic diagram of a refresh control circuit of another embodiment of the disclosure. The refresh control circuit 300 includes a clock signal generator 340, multiple frequency dividers 331 to 334, multiple address counters 321 to 324, and a database 350. Corresponding to the embodiment of FIG. 1, in this embodiment, the pulse number adjusters 131 to 134 are respectively implemented through the frequency dividers 331 to 334. In this embodiment, compared with the embodiment of FIG. 2, the refresh control circuit 300 adjusts the pulse number of the clock signal OSC in a time interval through the frequency dividers 331 to 334. In detail, the frequency dividers 331 to 334 respectively receive the data retention information DRI1 to DRI4 provided by the database 350. The frequency dividers 331 to 334 respectively set frequency division numbers according to the received data retention information DRI1 to DRI4, and execute frequency division operations on the clock signal OSC. Corresponding to the relatively high data retention information DRI1 to DRI4, each frequency divider 331 to 334 may be set to have a relatively high frequency division number. Conversely, corresponding to the relatively low data retention information DRI1 to DRI4, each frequency divider 331 to 334 may be set to have a relatively low frequency division number. In this embodiment, the frequency division number may be any real number greater than or equal to 1.

To further illustrate, when the frequency division number is larger, the pulse number of each adjusted clock signal POSC1 to POSC4 in a time interval is smaller. In this way, the refresh address information generated by updating the corresponding address counters 321 to 324 may be reduced, and the refresh frequency of the corresponding memory banks 311 to 314 may be reduced. Conversely, when the frequency division number is smaller, the pulse number of each adjusted clock signal POSC1 to POSC4 in a time interval is larger. In this way, the refresh address information generated by updating the corresponding address counters 321 to 324 may be increased, and the refresh frequency of the corresponding memory banks 311 to 314 may be increased. In other words, the frequency division number of each frequency divider 331 to 334 is positively correlated with the data retention represented by the corresponding data retention information DRI1 to DRI4.

It is worth mentioning that in the embodiments of FIG. 1 to FIG. 3, the number of memory banks may be any number. The four memory banks shown in FIG. 1 to FIG. 3 are only examples for illustration and are not intended to limit the implementation scope of the disclosure.

Figure 4:
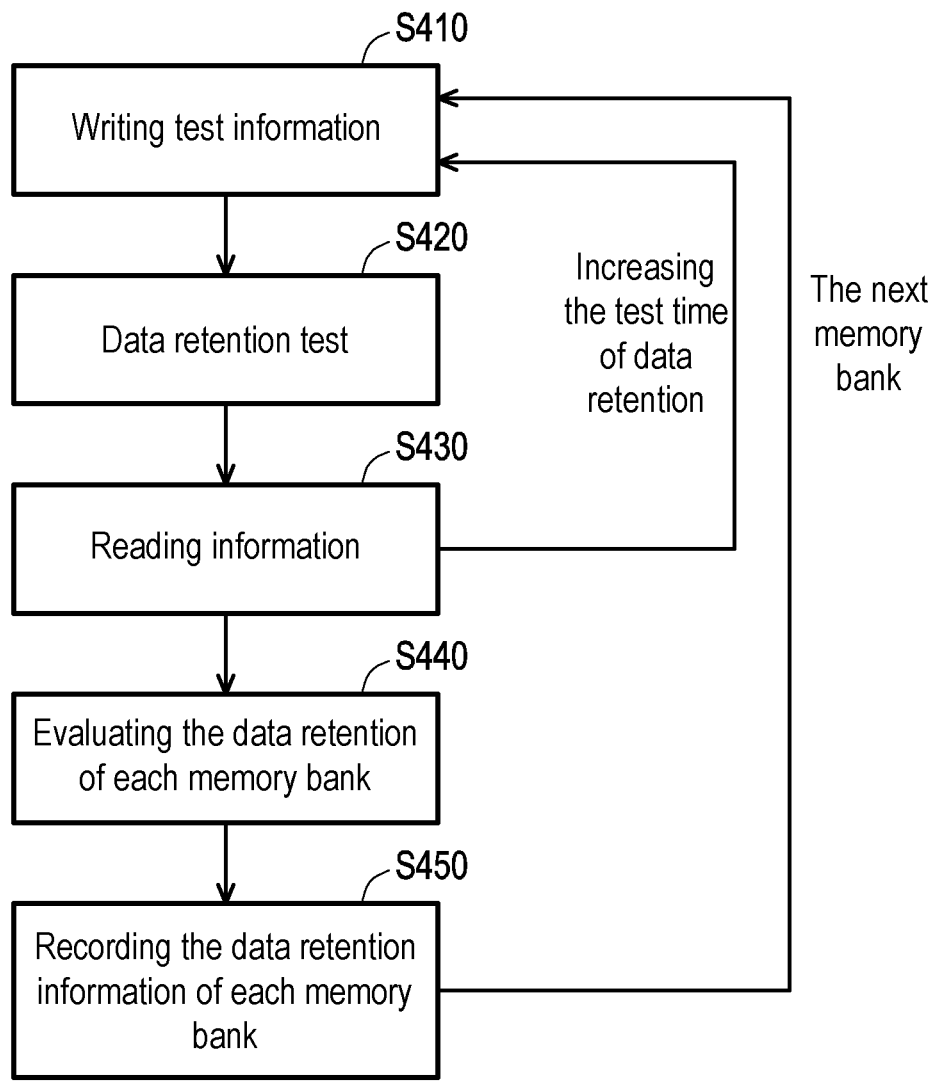
FIG. 4 is a flowchart of a generating method of data retention information of the embodiment of the disclosure.

Referring to FIG. 4, FIG. 4 is a flowchart of a generating method of data retention information of the embodiment of the disclosure. In step S410, test information may be written to multiple memory cells in the memory bank under testing. This test information may be a background pattern. Next, in step S420, a data retention testing operation is executed on the memory bank under testing. The data retention testing operation executed in step S420 may be implemented using any data retention testing operation related to memory in this field, without specific limitations.

In step S430, a reading information operation is executed on the memory cells in the memory bank under testing, and it is determined whether the test result is passed or failed by comparing the written information and the read information. It is worth mentioning that when the read information in step S430 matches the written information, the test time of data retention may be further increased, and step S410 may be returned to perform the next data retention test. Step S410 to step S430 may be repeated multiple times, and the data retention status in the memory bank under testing may be measured.

According to the above test result, in step S440, the data retention of the memory bank under testing may be evaluated, and thereby the data retention information may be generated. In step S450, the corresponding data retention information of each memory bank may be recorded. Step S410 is returned to execute the data retention testing operation of the next memory bank.

The above operation process may be executed by a testing device, which may be a testing machine outside the memory device.

Figure 5:
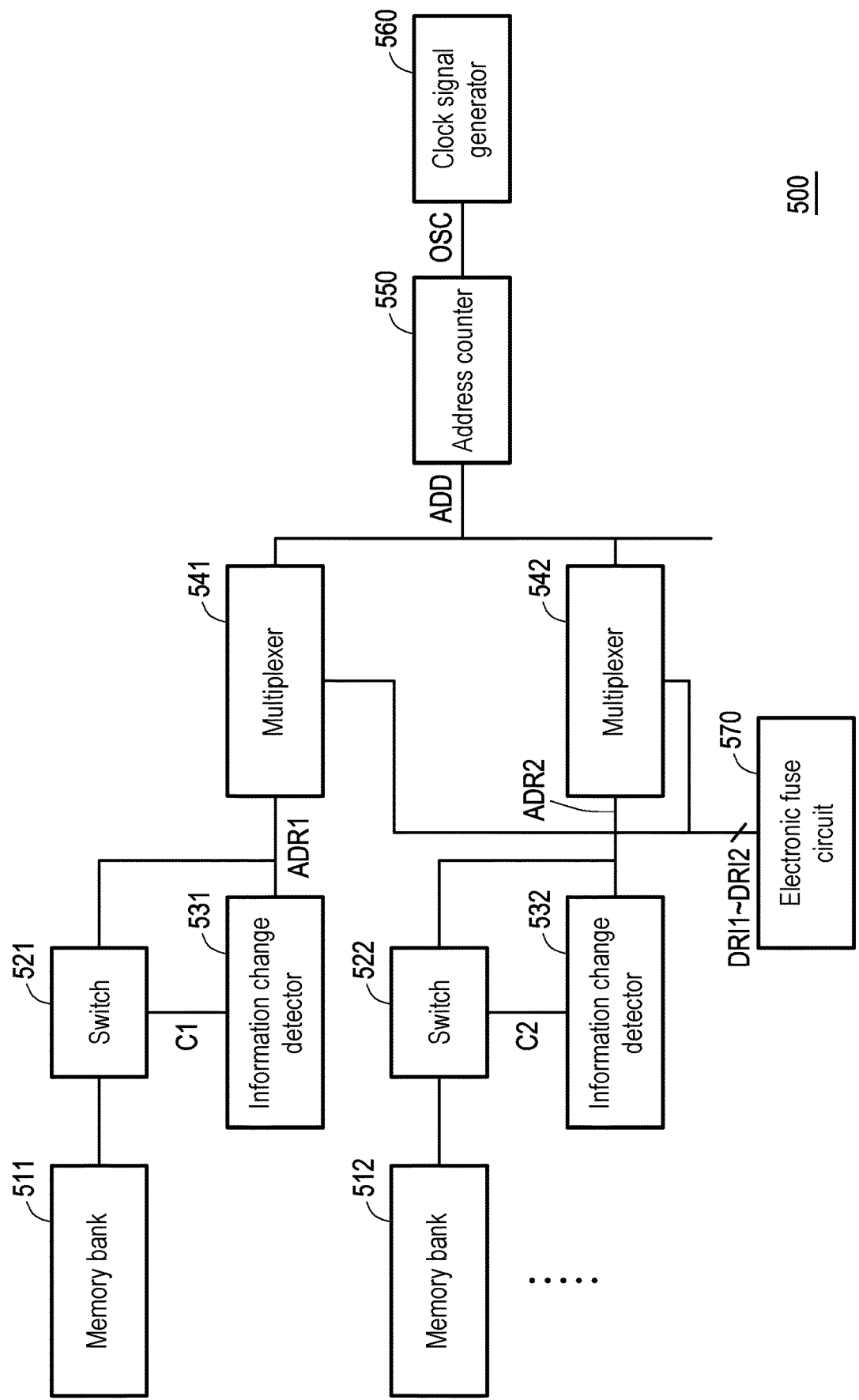
FIG. 5 is a schematic diagram of a refresh control circuit of another embodiment of the disclosure.

Referring to FIG. 5, FIG. 5 is a schematic diagram of a refresh control circuit of another embodiment of the disclosure. The refresh control circuit 500 includes a clock signal generator 560, an address counter 550, multiplexers 541 and 542, information change detectors 531 and 532, switches 521 and 512, and an electronic fuse circuit 570. The clock signal generator 560 is configured to generate the clock signal OSC. The address counter 550 is coupled to the clock signal generator 560 and configured to perform a counting operation according to the clock signal OSC to generate counting information ADD with N bits, where N is an integer greater than 2. The multiplexers 541 and 542 are coupled to the address counter 550 and jointly receive the counting information ADD. Furthermore, the multiplexers 541 and 542 are coupled to the electronic fuse circuit 570 and respectively receive the data retention information DRI1 and DRI2 provided by the electronic fuse circuit 570.

In this embodiment, the multiplexers 541 and 542 may respectively select M bits among the N-bits of the counting information ADD according to the data retention information DRI1 and DRI2, to respectively generate refresh address information ADR1 and ADR2.

To further illustrate, reference may be made to FIG. 6, FIG. 6 is a schematic diagram of a generating method of refresh address information of the refresh control circuit of the embodiment of FIG. 5 of the disclosure. In the embodiment of FIG. 5, the address counter 550 may respectively generate counting information ADD having 5 bits A0 to A4 in multiple counting cycles PL (0 to 15). The bit A0 may be the least significant bit of the counting information ADD, and the bit A4 may be the most significant bit of the counting information ADD. When the memory bank 511 has relatively low data retention, the multiplexer 541 may select the relatively low three bits (bits A0 to A2) according to the corresponding data retention information DRI1 to generate refresh address information ADR1. When the memory bank 512 has relatively high data retention, the multiplexer 542 may select the relatively high three bits (bits A2 to A4) according to the corresponding data retention information DRI2 to generate refresh address information ADR2.

It may be known from FIG. 6 that the change rate of the refresh address information ADR1 may be higher than the change rate of the refresh address information ADR2. In this way, the memory bank 511 with a relatively low data retention may be set to execute a relatively high frequency refresh operation, and the memory bank 512 with a relatively high data retention may be set to execute a relatively low frequency refresh operation.

Referring to FIG. 5 again, on the other hand, the information change detectors 531 and 532 are respectively coupled to the multiplexers 541 and 542. The information change detectors 531 and 532 respectively receive the refresh address information ADR1 and ADR2 provided by the multiplexers 541 and 542. The information change detectors 531 and 532 are respectively configured to detect a change status of the refresh address information ADR1 and ADR2 to generate control signals C1 and C2. The information change detectors 531 and 532 respectively transmit the generated control signals C1 and C2 to the switches 521 and 522. The switch 521 is coupled between the multiplexer 541 and the memory bank 511, and the switch 522 is coupled between the multiplexer 542 and the memory bank 512. The switches 521 and 522 respectively receive the control signals C1 and C2, and are respectively turned off or turned on according to the control signals C1 and C2.

In detail, taking the information change detector 531 as an example, when the information change detector 531 detects that the refresh address information ADR1 has not changed, the information change detector 531 may provide the control signal C1 to turn off the switch 521. Conversely, when the information change detector 531 detects that the refresh address information ADR1 has changed, the information change detector 531 may provide the control signal C1 to turn on the switch 521.

That is, only when the refresh address information ADR1 changes, the switch 521 may be turned on and transmit the new refresh address information ADR1 to the memory bank 511. In this way, the memory bank 511 may execute a refresh operation on the newly generated refresh address information ADR1.

In this embodiment, the information change detectors 531 and 532 may perform detection operations of information change by detecting whether the logic value of each bit in the refresh address information ADR1 and ADR2 has changed. The information change detectors 531 and 532 may be implemented using detection circuits of logic value change well known to those skilled in the art, without certain limitations. In addition, the switches 521 and 522 may be implemented using switch circuits well known to those skilled in the art, and the multiplexers 541 and 542 may be implemented using multiplexer circuits well known to those skilled in the art, without special limitations.

It is worth mentioning that in the embodiment of FIG. 5, the number of memory banks may be any number. The two memory banks shown in the figure are only examples for illustration and are not intended to limit the implementation scope of the disclosure.

To sum up, the refresh control circuit of the disclosure adjusts the pulse number of the clock signal configured to count the refresh address according to the data retention of the memory bank, and thereby controls the execution frequency of the refresh operation of the memory bank. In this way, memory banks with different data retention may execute refresh operations corresponding to different frequencies. It effectively reduces the number of unnecessary refresh operations in the memory device and improves the performance of the refresh operations in the memory device.

What is claimed is:

1. A clock signal generator, generating a clock signal;
a plurality of pulse number adjusters, coupled to the clock signal generator, receiving the clock signal, wherein during a time period, the pulse number adjusters respectively generate a plurality of adjusted clock signals by adjusting pulse number of the clock signal according to a plurality of data retention information; and
a plurality of address counters, respectively coupled to the pulse number adjusters and generating a plurality of refresh address information according to the adjusted clock signals, wherein the refresh address information correspond to a plurality of memory banks of the memory device, and the memory banks respectively perform refresh operations according to the refresh address information.

2. The refresh control circuit according to claim 1, further comprising:
a database, coupled to the pulse number adjusters and configured to store the data retention information.

3. The refresh control circuit according to claim 2, wherein the data retention information respectively corresponding to the memory banks are obtained by testing the memory banks of the memory device through a testing device, and the testing device stores the data retention information in the database.

4. The refresh control circuit according to claim 2, wherein the database is a read-only memory, a flash memory, or an electronic fuse circuit.

5. The refresh control circuit according to claim 1, wherein each of the pulse number adjusters comprises:
a gate control circuit, determining N number of pulses of the clock signal to be masked during the time period according to each of the corresponding data retention information, to generate each of the adjusted clock signals, wherein N is an integer greater than or equal to 0.

6. The refresh control circuit according to claim 5, wherein data retention represented by each of the data retention information are positively correlated with the number of pulses of the clock signal to be masked by each of the corresponding gate control circuits.

7. The refresh control circuit according to claim 1, wherein each of the pulse number adjusters comprises:
a frequency divider, performing frequency division of the clock signal according to each of the corresponding data retention information and generating each of the corresponding adjusted clock signal.

8. The refresh control circuit according to claim 7, wherein frequency division number of each of the frequency dividers are positively correlated to data retention represented by each of the corresponding data retention information.

9. A refresh control circuit, adapted for a memory device, comprising:
a clock signal generator, generating a clock signal;
an address counter, performing a counting operation based on the clock signal to generate counting information with N bits, wherein N is an integer greater than 2; and
a plurality of multiplexers, respectively corresponding to a plurality of memory banks of the memory device, wherein each of the multiplexers is coupled to each of the address counter, and selects M bits among the N bits of the counting information according to each of a plurality of data retention information, to generate each of a plurality of refresh address information,
wherein the refresh address information are respectively provided to the memory banks, so that the memory banks respectively perform refresh operations according to the refresh address information.

10. The refresh control circuit according to claim 9, further comprising:
a plurality of information change detectors, respectively coupled to the multiplexers, respectively generating a plurality of control signals according to whether the respectively corresponding refresh address information changes; and
a plurality of switches, respectively coupled between the multiplexers and the memory banks and respectively coupled to the information change detectors, wherein each of the switches determines whether to transmit each of the refresh address information to each of the corresponding memory banks according to each of the corresponding control signals.

11. The refresh control circuit according to claim 10, wherein each of the control signals is generated so that each of the corresponding switches is turned on when each of the information change detectors detects that each of the corresponding refresh address information has changed.

12. The refresh control circuit according to claim 9, further comprising:
   a database, coupled to the multiplexers and configured to store the data retention information.

13. The refresh control circuit according to claim 12, wherein the database is an electronic fuse circuit.

* * * * *